US 6,984,611 B2

(12) United States Patent
Kercheville et al.

(10) Patent No.: US 6,984,611 B2
(45) Date of Patent: Jan. 10, 2006

(54) SPOTTING FLUID FOR DIFFERENTIAL STICKING

(75) Inventors: James D. Kercheville, Houston, TX (US); Kenneth W. Pober, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/680,951

(22) Filed: Oct. 8, 2003

(65) Prior Publication Data

US 2004/0072697 A1    Apr. 15, 2004

Related U.S. Application Data

(62) Division of application No. 10/117,957, filed on Apr. 8, 2002, now Pat. No. 6,662,871, which is a division of application No. 09/758,754, filed on Jan. 10, 2001, now Pat. No. 6,435,276.

(51) Int. Cl.
    *C09K 3/00* (2006.01)
(52) U.S. Cl. ................ 507/266; 507/267; 507/940
(58) Field of Classification Search ............... 507/265, 507/266, 267, 138, 139, 940; 175/64; 166/255.1, 166/301
    See application file for complete search history.

(56) References Cited

U.S. PATENT DOCUMENTS

| | | | |
|---|---|---|---|
| 3,217,802 A | | 11/1965 | Reddie et al. |
| 3,642,623 A | | 2/1972 | Bennett et al. |
| 4,427,564 A | | 1/1984 | Brownswell et al. |
| 4,436,638 A | | 3/1984 | Walker et al. |
| 4,464,269 A | | 8/1984 | Walker et al. |
| 4,614,235 A | | 9/1986 | Keener et al. |
| 4,964,615 A | | 10/1990 | Mueller et al. |
| 5,100,697 A | * | 3/1992 | Nielsen ............... 427/133 |
| 5,141,920 A | | 8/1992 | Bland et al. |
| 5,232,910 A | * | 8/1993 | Mueller et al. ............ 507/138 |
| 5,260,268 A | | 11/1993 | Forsberg et al. |
| RE36,066 E | * | 1/1999 | Mueller et al. ............ 507/138 |
| 2004/0082483 A1 | * | 4/2004 | Muller et al. ............ 507/100 |

* cited by examiner

*Primary Examiner*—Philip C. Tucker

(74) *Attorney, Agent, or Firm*—Craig W. Roddy; Karen B. Tripp

(57) ABSTRACT

A new composition for a spotting fluid and a method of using such spotting fluid for freeing differential stuck pipe in a subterranean well drilling operation is disclosed. The composition comprises an invert water-in-oil emulsion comprising iso-butyl oleate as its external phase and glycerin as the internal phase. In an alterative embodiment, calcium chloride and water may be substituted for glycerin.

13 Claims, No Drawings

SPOTTING FLUID FOR DIFFERENTIAL STICKING

This application is a division of and claims priority from U.S. patent application Ser. No. 10/117,957, filed Apr. 8, 2002, now U.S. Pat. No. 6,662,871, which is a division of U.S. patent application Ser. No. 09/758,754, filed Jan. 10, 2001, and issued as U.S. Pat. No. 6,435,276 on Aug. 20, 2002.

BACKGROUND OF THE INVENTION

1. Field of the Invention

This invention relates to compositions and methods for unsticking or freeing differential stuck pipe used in drilling a borehole for hydrocarbons in a subterranean formation.

2. Description of Relevant Art

Rotary drilling methods employing a drill bit and drill stems have long been used to drill wellbores in subterranean formation. Drilling fluids or muds are commonly circulated in the well during such drilling to cool and lubricate the drilling apparatus, lift cuttings out of the wellbore, and counterbalance the subterranean formation pressure encountered. The specific gravity of a well fluid is normally adjusted in such a way that the pressure of the fluid on the rock formations exceeds the formation pressure on the well. As a result, liquid components of the well fluid are forced into the formation surrounding the well while insoluble components settle on the walls of the well in the form of a stabilizing "filter cake."

Inevitably in drilling a well, the path followed by the drill pipes will deviate some from the vertical or other desired path for the well. At such consequent deviations or "kinks," the rotating drill pipes may come into contact with the filter cake and even with the wall of the well and become buried therein, resulting in jamming or sticking.

Such jamming or sticking is particularly common when pipe connections, which are larger in diameter than the drill pipes themselves, come into contact with the kinks.

The most frequent cause of jamming or sticking of drill pipes is differential jamming. Differential jamming can occur when the rotation of the drill pipes is stopped. If a drill pipe then comes into contact with the filter cake adhering to the wall of the well, the drill pipe is forced into the wall of the well by the hydrostatic pressure of the column of mud. The contact surface is then isolated from the mud pressure. If, as is usually the case, the mud pressure is greater than the formation pressure, the contact surface is held fast to the wall by suction forces. The suction force increases with the thickness and compressibility of the filter cake. With time, even relatively large sections of the drill pipe can become held fast. Thus, prompt treatment is best.

Prompt freeing of the stuck drill pipe is also needed to alleviate lost drilling time and the consequent costs which that involves.

Spotting fluids are used by those skilled in the art to free stuck drill pipe. Spotting fluids need a good lubricating effect and the ability to ensure good oil wettability of the surfaces of the drill pipe and of the walls of wells coming into contact with the drill pipe.

To maximize utility in freeing stuck pipe, the spotting fluid should be applied at exactly the point in the well at which the pipe has become stuck. This is accomplished in the same general way in which the well fluid is introduced into the well. Instead of the well fluid, the spotting fluid is forced through the interior of the drill pipe to the bit, which leaves the bit, and slowly ascends in the well to the point of the stuck pipe. Thus, it is critically important to be able to exactly adjust the specific gravity of the spotting fluid so that it will be such as to keep the spotting fluid at that location in the well of the stuck pipe for sufficient time for its lubricity-enhancing properties to act to free the stuck pipe.

Since prompt use of a spotting fluid is important, it is standard practice at the drill site to store spotting fluid or spotting fluid concentrates which may rapidly be adjusted to the required density and consistency by addition of barite or other weighting materials and optionally other additives and water.

Spotting fluids known in the art typically consist of hydrocarbon mixtures, often based on diesel oils or mineral oils. Emulsifiers and surfactants are typical additives.

Such prior art spotting fluids may cause environmental concerns if they come into contact with ground soil formations. Further, since oil based spotting fluids mix with the drilling fluid during discharge from the well, such oil based spotting fluids contaminate the water based drilling fluids which then have to be discarded and separately treated to avoid environmental concerns, adding further to the drilling costs. The environmental concerns are enhanced in off-shore drilling where there is less space to store discarded fluids for treatment.

U.S. Pat. No. 4,964,615 issued in 1990 to Mueller et al. discloses an ester based spotting fluid that is said to have fewer environmental concerns than the mineral oil or diesel oil based fluids. However, a need continues to exist for more efficient and improved, environmentally friendly spotting fluids that are effective in freeing stuck pipe.

SUMMARY OF THE INVENTION

The composition and method of the present invention are useful in treating and alleviating stuck pipe, particularly differential stuck pipe, during drilling of a wellbore in a subterranean formation. The preferred composition of the invention is an invert oil mud system comprising iso-butyl oleate as the external phase and glycerin (preferably) or calcium chloride ($CaCl_2$) solution as the internal phase. For application to stuck pipe downhole, this emulsion may be combined with, added to, or mixed with other fluids for carrying the emulsion to the treatment site and holding it there long enough to free the stuck pipe.

DETAILED DESCRIPTION OF THE INVENTION

The present invention provides a new composition and method of using such composition for freeing stuck drill pipes. The composition and method are particularly useful in freeing differential stuck pipe.

The composition of the invention comprises a water-in-oil emulsion or an invert oil mud system. The emulsion comprises iso-butyl oleate as the external phase and either glycerin (preferably) or calcium chloride as the internal phase, preferably in a ratio ranging from about 95:5 to about 50:50 oil phase to water phase or more specifically oleate to either glycerin or about 38% aqueous calcium chloride solution. This emulsion may be added to or mixed with other treatment products and with materials or products to facilitate delivery of the emulsion to the site of the stuck pipe and holding of the emulsion at such site sufficient time to enable the emulsion to cause or effect unsticking of the pipe. Such typical additives or additional materials include, for example, about 2 to about 14 pounds per barrel EZ-MUL NTE™ (an emulsifier/oil wetting agent), available from Halliburton Energy Services, Inc., Houston, Tex.; about 0.5 to about 3.0 pounds per barrel DRILTREAT™ (a supplemental oil wetting agent), available from Halliburton Energy Services, Inc., Houston, Tex.; about 2 to about 6 pounds per barrel GELTONE II™ (a viscosifier or suspending agent), available from Halliburton Energy Services, Inc., Houston, Tex.; and barite as needed for desired fluid density.

An example formulation of a preferred spotting fluid of the invention comprises, as the external phase, about 0.7 barrel (bbl) of iso-butyl oleate as the external phase and, as the internal phase, about 0.3 bbl of glycerin. This formulation is combined with about 8 lb/bbl of EZ-MUL NTE™; about 1 lb/bbl of DRILTREAT™; about 3 lb/bbl of GELTONE II; and barite as needed for desired density.

The iso-butyl oleate/glycerin invert emulsion of the invention has the advantageous ability to not only lubricate the surfaces involved in sticking of the metal (of drill pipe or other stuck equipment in the filter cake) but also to dehydrate or destruct the filter cake for enhanced performance as a spotting fluid. The iso-butyl oleate oil phase is effective at lubricating the surfaces and penetrating the filter cake. Glycerin is effective at dehydrating the filter cake. In fact, glycerin, with an $a_w \cong 0.0$ ($a_w$ means activity, water phase), is even better at such dehydration than is calcium chloride, with an $a_w \cong 0.30$, which has been known to be effective at dehydrating filter cakes.

The emulsions of the invention were tested for performance as a spotting fluid in a differential sticking tester, or STICKOMETER™, manufactured by and available from Halliburton in Houston, Tex. The STICKOMETER™ consists of a modified filtration cell in which a mud cake to be tested is deposited by filtration of a mud under pressure. A flat plate is pressed under load onto the mud cake. Spotting fluid is then allowed to soak around the mud cake and stuck plate apparatus. After a period of time, typically about 16 hours, torque-to-flee is measured. This torque is a relative measure of sticking tendency. A typical test procedure follows. Already prepared mud was allowed to filter under 500 psi pressure, generating a mud cake, while collecting 10 ml of filtrate. The metal disk was then stuck in the mud cake, and 2 ml of additional filtrate was collected. For base mud, filtering was done overnight without collecting the 2 ml of filtrate. For spotting fluid evaluation, the pressure was relieved after 2 ml of filtrate, the base mud decanted, then spotting fluid loaded into the cell. Pressure was reapplied and filtration continued overnight, for about 16 hours. The torque was measured the next morning while maintaining 500 psi pressure on the cell.

In testing this invention, an invert-oil emulsion of iso-butyl oleate and glycerine was prepared and tested in a STICKOMETER™ and test results—torque to free in inch pounds (in/lbs)—and compared to results with other fluids, including known spotting fluids and commercially available spotting fluids such as COASTAL SPOT™, available from Coastal Mud and Coastal Fluid Technologies, Lafayette, La., a division of Coastal Chemical Co., LLC a Holland Chemical International Co. Tables 1 through 4 show the performance of various experimental and commercial spotting fluid treatments in selected mud systems. In each case, the isobutyl oleate/glycerine composition of the present invention yielded equal or better results than any product tested.

TABLE I

| Mud System/Spot | Torque-to-Free (in/lbs) |
|---|---|
| Base A (16 ppg Freshwater Lignosulfonate) | 350 |
| Base A with addition of: | |
| Diesel oil | 170 |
| 11.6 CaCl$_2$ brine | 110 |
| 12.7 NaBr brine | 190 |
| 12.7 NaBr brine/3% TORQ TRIM II ™ | 150 |
| 12.7 NaBr brine/3% FSE Fluoro-surfactant | 150 |
| 30% 12.7 NaBr brine/70% Glycerine | 200 |
| Squalane C$_{30}$H$_{62}$ | 120 |
| Squalene C$_{30}$H$_{50}$ | 180 |
| Isobutyl Oleate Neat | 60 |
| Oleyl Oleate Neat | 80 |
| 16 ppg COASTAL SPOT ™/CaCl$_2$ | 50 |
| 16 ppg COASTAL SPOT ™/NaCl | 170 |
| 16 ppg Phase 1 of DUAL PHASE ™ | 110 |
| 16 ppg Phase 1 & 2 of DUAL PHASE ™ | 110 |
| 16 ppg Isobutyl Oleate/CaCl$_2$ | 70 |
| 16 ppg Isobutyl Oleate/Glycerine | 40 |
| 16 ppg Oleyl Oleate/Glycerine | 55 |

TORQ TRIM II™ is available from Halliburton Energy Services, Inc. in Houston, Tex.; COASTAL SPOT™ is available from Coastal Mud and Coastal Fluid Technologies in Lafayette, La.; and DUAL PHASE™ is available from Halliburton Energy Services, Inc. in Houston, Tex.

The base mud in Table 1 is a 16 lb/gal freshwater/lignosulfonate mud. This base mud shows torque-to-free at 350 inch-pounds, a "high" number in terms of sticking tendency, indicating the mud alone likely will not be able to free a stuck pipe. A low torque-to-free number represents or indicates low sticking tendency. As shown in Table 1, all of the various spotting fluid treatments provided some improvement over the base mud for purposes of freeing stuck pipe. The isobutyl oleate/glycerine system of the present invention yielded the best performance, with a very low torque-to-free number of 40.

TABLE 2

| Mud System/Spot | Torque-to-Free (in/lbs) |
|---|---|
| Base B (16 ppg Seawater Lignosulfonate) | 280 |
| Base B with addition of: | |
| 16 ppg COASTAL SPOT ™/CaCl$_2$ | 300 |
| 16 ppg ENVIRO-SPOT ™/Freshwater | 270 |
| 16 ppg Phase 1 of DUAL PHASE ™ | 290 |
| 16 ppg Phase 1 & 2 of DUAL PHASE ™ | 290 |

TABLE 2-continued

| Mud System/Spot | Torque-to-Free (in/lbs) |
|---|---|
| 16 ppg Isobutyl Oleate/Glycerine | 210 |
| 16 ppg Isobutyl Oleate/Glycerine (after 250° F. hot roll) | 180 |

COASTAL SPOT™ is available from Coastal Mud and Coastal Fluid Technologies in Lafayette, La.; ENVIROSPOT™ is available from Halliburton Energy Services, Inc. in Houston, Tex.; and DUAL PHASE™ is available from Halliburton Energy Services, Inc. in Houston, Tex.

Table 2 shows results with a 16 lb/gal seawater/lignosulfonate mud system. The control or base mud has a torque-to-free value of 280 in/lbs. Best performance again was with the isobutyl oleate/glycerine composition of the present invention, providing a torque-to-free of 210 in/lbs. Hot rolling this spotting fluid at 250° F. before conducting the STICKOMETER™ test yielded further improved results.

TABLE 3

| Mud System/Spot | Torque-to-Free (in/lbs) |
|---|---|
| Base C (16 ppg POLYNOX ™) | 380 |
| Base C with addition of: | |
| 16 ppg COASTAL SPOT ™/CaCl$_2$ | 240 |
| 16 ppg Phase 1 of DUAL PHASE ™ | 260 |
| 16 ppg Isobutyl Oleate/Glycerine | 160 |
| Base D (16 ppg PHPA Mud) | 205 |
| Base D with addition of: | |
| 16 ppg COASTAL SPOT ™/CaCl$_2$ | 160 |
| 16 ppg Phase 1 of DUAL PHASE ™ | 155 |
| 16 ppg Isobutyl Oleate/Glycerine | 170 |

POLYNOX™ is available from Halliburton Energy Services, Inc. in Houston, Tex.; COASTAL SPOT™ is available from Coastal Mud and Coastal Fluid Technologies in Lafayette, La.; and DUAL PHASE™ is available from Halliburton Energy Services, Inc. in Houston, Tex.

Table 3 shows some limited results with a POLYNOX™ mud and with a PHPA (partially-hydrolyzed, polyacrylamide) based mud, both at 16 lb/gal. Again, isobutyl oleate/glycerine of the present invention showed the best results in the POLYNOX™ system. COASTAL SPOT™, DUAL PHASE™ and isobutyl oleate/glycerine of the present invention showed about the same performance in the PHPA mud system.

TABLE 4

| Mud System/Spot | Torque-to-Free (in/lbs) |
|---|---|
| Base E (12 ppg Freshwater Lignosulfonate) | 185 |
| Base E with addition of: | |
| 12 ppg DUAL PHASE ™ | 115 |
| 12 ppg COASTAL SPOT ™-old | 75 |
| 12 ppg COASTAL SPOT ™-new | 70 |
| 12 ppg Isobutyl Oleate/Glycerine | 80 |

Table 4 shows results with a 12 lb/gal freshwater/lignosulfonate mud system. Three commercial products and the isobutyl oleate/glycerine composition of the present invention showed similar performance in this mud system. With each, torque was reduced by over 50%.

Further, the iso-butyl oleate/glycerin composition of the present invention is environmentally acceptable. Mysid shrimp $LC_{50}$ tests were conducted according to industry standards. An invert emulsion comprising the oleate/glycerin composition was evaluated at 5 and 10 volume % in generic #7 drilling fluid (industry standard). Results for 96-hour LC50 in mg/L SPP were 267,600 and 227,700 respectively. Gulf of Mexico minimum by regulation is 30,000. Operators prefer 100,000 or more.

Without wishing to limit the invention, it is expected that the isobutyl oleate/glycerine composition of the present invention would be used over a density range of about 10 to about 16 lb/gal., depending on the circumstances of the case, and likely particularly associated with the well and the stuck pipe. Table 5 shows rheology and mud properties for an isobutyl oleate/glycerine invert mud system at 10, 13 and 16 lb/gal densities. These values in Table 5 are consistent with a reliable and stable mud system over this density range.

TABLE 5

Study of Mud Properties or 10, 13, & 16 lb/gal experimental spotting fluid pills comparison of GELTONE II & SUSPENTONE

| Sample Mark | A | A | B | B | C | C | D | D | E | E | F | F | G** | G** | H*** | H*** |
|---|---|---|---|---|---|---|---|---|---|---|---|---|---|---|---|---|
| Experimental Spotting Fluid, bbl | 0.66* | | 0.62* | | 0.57* | | 0.66* | | 0.62* | | 0.57* | | 0.57* | | | |
| Glycerine, bbl | 0.23 | | 0.17 | | 0.11 | | 0.23 | | 0.17 | | 0.11 | | 0.11 | | SEE | SEE |
| Barite | 124 | | 293 | | 456 | | 123 | | 293 | | 456 | | 456 | | B | B |
| GELTONE II ™, lb | 4 | | 3 | | 2 | | — | | — | | — | | — | | E | E |
| SUSPENTONE ™, lb | — | | — | | — | | 4 | | 3 | | 2 | | 2 | | L | L |
| | | | | | | | | | | | | | | | O | O |
| Density, lb/gal. | 10.0 | | 13.0 | | 16.0 | | 10.0 | | 13.0 | | 16.0 | | 16.0 | | W | W |
| Stirred, min. | 30 | — | 30 | — | 30 | — | 30 | — | 30 | — | 30 | — | 30 | — | 30 | — |
| FANN 35: | 80 | 120 | 80 | 120 | 80 | 120 | 80 | 120 | 80 | 120 | 80 | 120 | 80 | 120 | 80 | 120 |
| Temp ° F. | | | | | | | | | | | | | | | | |
| 600 rpm | 76 | 52 | 102 | 72 | 151 | 108 | 75 | 53 | 108 | 75 | 154 | 112 | OFF | 290 | O/S | 170 |
| 300 rpm | 45 | 30 | 59 | 41 | 85 | 60 | 46 | 31 | 64 | 43 | 88 | 63 | S | 180 | 212 | 91 |
| 200 rpm | 34 | 20 | 43 | 30 | 63 | 49 | 35 | 20 | 44 | 32 | 64 | 51 | C | 140 | 150 | 70 |
| 100 rpm | 22 | 14 | 27 | 20 | 39 | 28 | 20 | 15 | 28 | 22 | 40 | 30 | A | 95 | 85 | 40 |
| 6 rpm | 6 | 4 | 7 | 5 | 9 | 7 | 6 | 4 | 7 | 6 | 9 | 8 | L | 35 | 15 | 10 |
| 3 rpm | 5 | 3 | 6 | 4 | 8 | 6 | 5 | 3 | 6 | 5 | 8 | 7 | E | 31 | 12 | 8 |

TABLE 5-continued

Study of Mud Properties or 10, 13, & 16 lb/gal experimental spotting fluid pills comparison of GELTONE II & SUSPENTONE

| Sample Mark | A | A | B | B | C | C | D | D | E | E | F | F | G** | G** | H*** | H*** |
|---|---|---|---|---|---|---|---|---|---|---|---|---|---|---|---|---|
| Plastic Viscosity, cp | 31 | 22 | 43 | 31 | 66 | 48 | 29 | 22 | 44 | 32 | 66 | 49 | — | 110 | — | 79 |
| Yield Point, lb/100 sq. ft. | 14 | 8 | 16 | 10 | 19 | 12 | 17 | 9 | 20 | 11 | 22 | 14 | — | 70 | — | 12 |
| 10 sec gel, lb/100 sq. ft. | 4 | 3 | 5 | 4 | 6 | 5 | 5 | 3 | 5 | 4 | 8 | 7 | — | 30 | 12 | 7 |
| 10 min gel, lb/10 sq. ft. | 6 | 5 | 7 | 6 | 9 | 7 | 9 | 6 | 10 | 8 | 12 | 11 | — | 52 | 20 | 12 |
| Electrical Stability, V | 312 | 288 | 512 | 609 | 612 | 714 | 504 | 512 | 761 | 832 | 1124 | 1180 | 1312 | 1406 | 395 | 412 |
| Filtrate, 200° F., 500 psi, ml | | | | | | | | | | | | | | | | |
| Oil, ml | 27.4 | | | | 36.4 | | | | | | | | | | 17.2 | |
| Water, ml | 8.8 | | | | 14.6 | | | | | | | | | | 0.8 | |

The single asterisk in Table 5 designates values for the experimental spotting fluid which comprised 8 lb EZ MUL NTE™ and 1 lb DRIL TREAT™ in a barrel of isobutyl oleate. Double asterisks in Table 5 designates values for Experimental Spotting Fluid (Sample G) which comprised 8 lb EZ MUL NTE™ and 1 lb DRILTREAT™ in a barrel of oleyl oleate. Triple asterisks in Table 5 designates values for Sample H which comprised COASTAL SPOT™ which comprised a 16.0 lb/gal pill mixed according to COASTAL SPOT™ guidelines.

Table 6 shows a decided advantage of the invention. The test results of Table 6 show not only the effectiveness of the oleate/glycerin invert emulsion as a spotting fluid, but also that such spotting fluid in the water-based drilling fluid does not have to be separated and removed from the operating mud system after use, saving time and money. Spotting fluid volumes are typically about 50 to about 100 barrel "pills" in operating mud systems of about 1000 barrels or more. Once stuck pipe is no longer stuck, i.e., is free, the spotting fluid composition of the present invention used to free the pipe can be circulated in with the operating mud system. Table 6 shows that up to about 10 volume percent of isobutyl oleate/glycerine fluid mixed in with a seawater/lignosulfonate mud creates no final mud problems. To the contrary, the lubricity of the final mud mixture is improved some by leaving in the isobutyl oleate/glycerine, a further advantage of the invention.

TABLE 6

CONTAMINATION TESTS (sea water mud)
Initial Properties and Properties After Hot Rolling at 150° F. and 250° F.

| Sample Mark | A | A | B | B | C | C | AA | D | D | DD |
|---|---|---|---|---|---|---|---|---|---|---|
| Base Mud*, bbl | 1.0 | 1.0 | 1.0 | 1.0 | 1.0 | 1.0 | 1.0 | 1.0 | 1.0 | 1.0 |
| Experimental Spotting Fluid Pill, bbl | — | — | 0.05 | 0.05 | 0.10 | 0.10 | — | 0.10 | 0.10 | 0.10 |
| Q-BROXIN™, lb | — | — | — | — | — | — | — | 2.0 | 2.0 | 2.0 |
| CARBONOX™, lb | — | — | — | — | — | — | — | 2.0 | 0.0 | 1.0 |
| Caustic soda, lb | | | | | | | | 1.0 | 1.0 | 1.0 |
| Stirred, min | 15 | 15 | 15 | 15 | 15 | 15 | 15 | 15 | 15 | 15 |
| Rolled at 150° F., hr | 0 | 16 | 0 | 16 | 0 | 16 | 16 | 0 | 16 | 16 |
| Rolled at 250° F., hr | — | — | — | — | — | — | 16 | — | — | 16 |
| Test Temp., ° F. | 80 | 80 | 80 | 80 | 80 | 80 | 80 | 80 | 80 | 80 |
| Mud Density, lb/gal. | 16.0 | 16.0 | 16.0 | 16.0 | 16.0 | 16.0 | 16.0 | 16.0 | 16.0 | 16.0 |
| Plastic Viscosity, cp | 40 | 44 | 34 | 38 | 39 | 38 | 37 | 35 | 41 | 39 |
| Yield Point, lb/100 sq. ft | 18 | 13 | 36 | 31 | 41 | 36 | 13 | 25 | 19 | 13 |
| 10 sec gel, lb/100 sq ft | 7 | 6 | 16 | 12 | 20 | 17 | 4 | 8 | 7 | 5 |
| 10 min gel, lb/100 sq ft | 21 | 18 | 40 | 30 | 50 | 41 | 12 | 24 | 18 | 15 |
| pH | 9.7 | 9.4 | 9.8 | 9.5 | 9.7 | 9.2 | 8.9 | 11.7 | 11.2 | 9.2 |
| API Filtrate, ml | — | 2.6 | — | 3.2 | — | 3.6 | — | — | 3.0 | — |
| Filtrate, 250° F., 500 psi, ml | — | 8.4 | — | 10.0 | — | 9.8 | — | — | 8.2 | — |
| FANN 35: | | | | | | | | | | |
| 600 rpm | 98 | 101 | 104 | 107 | 119 | 112 | 87 | 95 | 101 | 91 |
| 300 rpm | 58 | 57 | 70 | 69 | 80 | 74 | 50 | 60 | 60 | 52 |
| 200 rpm | 45 | 43 | 55 | 57 | 65 | 63 | 38 | 50 | 48 | 44 |
| 100 rpm | 30 | 27 | 37 | 38 | 48 | 45 | 21 | 30 | 28 | 22 |
| 6 rpm | 9 | 7 | 18 | 14 | 24 | 19 | 5 | 9 | 8 | 6 |
| 3 rpm | 7 | 6 | 16 | 12 | 22 | 17 | 4 | 8 | 7 | 5 |

TABLE 6-continued

CONTAMINATION TESTS (sea water mud)
Initial Properties and Properties After Hot Rolling at 150° F. and 250° F.

| Sample Mark | A | A | B | B | C | C | AA | D | D | DD |
|---|---|---|---|---|---|---|---|---|---|---|
| LUBRICITY COEFFICIENT | — | 0.23 | — | — | — | — | — | — | 0.18 | — |
| % Lubricity Improvement | — | — | — | — | — | — | — | — | 21.7 | |

The Base Mud in Table 6 is comprised of 0.72 bbl sea water, 12 lb AQUAGEL™, 30 lb Rev Dust, 4 lb Q-BROXIN™, 1 lb caustic soda, 416 lb barite and 0.5 lb BARAZAN PLUS™. AQUAGEL™ is available from Halliburton Energy Services, Inc. in Houston, Tex.; Q-BROXIN™ is available from Halliburton Energy Services, Inc. in Houston, Tex.; and BARAZAN PLUS™ is available from Halliburton Energy Services, Inc. in Houston, Tex.

In the method of the invention, a spotting fluid comprising an invert water-in-oil emulsion of the invention—glycerin or calcium chloride brine in isobutyl oleate—is used to free stuck pipe, particularly differentially stuck pipe.

The foregoing description of the invention is intended to be a description of preferred embodiments. Various changes in the details of the described composition and method can be made without departing from the intended scope of this inventions as defined by the appended claims.

We claim:

1. A spotting fluid for freeing differential stuck pipe comprising an invert emulsion comprising iso-butyl oleate as the external phase and glycerin as the internal phase.

2. The spotting fluid of claim 1 wherein the spotting fluid contains additives for obtaining a desired density.

3. The spotting fluid of claim 1 wherein the spotting fluid comprises barite.

4. The spotting fluid of claim 1 wherein the spotting fluid enhances lubricity.

5. The spotting fluid of claim 1 wherein the emulsion is mixed with a water-based fluid.

6. The spotting fluid of claim 1 wherein the spotting fluid reduces torque by at least about 50%.

7. The spotting fluid of claim 1 wherein the spotting fluid provides a low torque-to-free number.

8. The spotting fluid of claim 1 wherein the spotting fluid provides a torque-to-free number of less than about 110 in/lbs.

9. The spotting fluid of claim 1 wherein the spotting fluid provides a torque-to-free number of about 55 in/lbs or less.

10. The spotting fluid of claim 1 wherein the Mysid shrimp $LC_{50}$ test results for the spotting fluid for 96-hours in mg/L SPP were at least about 227,700.

11. The spotting fluid of claim 1 wherein the spotting fluid is used over a density range of from about 10 to about 16 lbs/gal.

12. The spotting fluid of claim 1 further comprising at least one of an emulsifier, wetting agent, suspending agent and barite.

13. The spotting fluid of claim 1 wherein the ratio of iso-butyl oleate to glycerin ranges from about 95:5 to about 50:50.

* * * * *